(12) United States Patent
DiBello (10) Patent No.: US 6,378,544 B1
(45) Date of Patent: Apr. 30, 2002

(54) PRESSURE RELIEF DEVICE AND METHOD OF USING THE SAME

(75) Inventor: Gerald N. DiBello, West Chester, PA (US)

(73) Assignee: CFMT, Inc., Wilmington, DE (US)

( * ) Notice: Subject to any disclaimer, the term of this patent is extended or adjusted under 35 U.S.C. 154(b) by 0 days.

(21) Appl. No.: 09/564,358

(22) Filed: Apr. 19, 2000

Related U.S. Application Data (60) Provisional application No. 60/130,466, filed on Apr. 22, 1999.

(51) Int. Cl.[7] .............................................. F16K 17/40

(52) U.S. Cl. .............................. 137/68.25; 137/625.27; 137/910

(58) Field of Search ........................... 137/68.19, 68.25, 137/68.26, 68.27, 68.23, 910; 220/89.2

(56) References Cited

U.S. PATENT DOCUMENTS

| | | | |
|---|---|---|---|
| 2,548,298 A | 4/1951 | Simons ........................ | 220/89 |
| 2,922,544 A | 1/1960 | Hibbard et al. ................ | 220/89 |
| 2,952,383 A | 9/1960 | Paxton et al. ................. | 220/89 |
| 3,854,522 A | 12/1974 | Didczy et al. ................. | 165/1 |
| 4,102,469 A | 7/1978 | Shegrud et al. ........... | 220/89 A |
| 4,119,112 A | 10/1978 | Adler ........................ | 137/68 R |
| 4,195,745 A | 4/1980 | Roberts et al. .............. | 220/2.2 |
| 4,404,982 A | 9/1983 | Ou ........................... | 137/68 R |
| 4,454,905 A | 6/1984 | Oy et al. ................... | 220/89 A |
| 4,498,368 A | 2/1985 | Doane ....................... | 89/1.817 |

(List continued on next page.)

OTHER PUBLICATIONS

BS&B Safety Systems, "An Introduction to Rupture Disk Technology," Tulsa, OK, 1995, Catalog 77-1001, Section A, 1-12.

BS&B Safety Systems, "Rupture Disk Selection Guide," Tulsa, OK, 1996, Catalog 77-1003, Section B, 3 pages.

BS&B Safety Systems, "Special Applications and Preventive Maintenance," BS&B Safety Heads and Rupture Disks, Tulsa, OK, Catalog 77-1007, Section B, 1-11, Date Unknown.

BS&B Safety Systems, "The STA-SAF System," Tulsa, OK, Catalog 77-4001, Section D-4, 1-11, Date Unknown.

BS&B Safety Systems, "RB-90 Reverse Buckling Disks," Tulsa, OK, Catalog 77-4006, Section D-4, 1-6, Date Unknown.

BS&B Safety Systems, "The NU-SAF System," Tulsa, OK, Catalog 77-5003, Section C-2, 4 pages, Date Unknown.

BS&B Safety Systems, "VENT-SAF Explosion Vents," Tulsa, OK, Catalog 77-8015, Section C, 4 pages, date Unknown.

BS&B Safety Systems, "SAF-T-GRAF ™ Graphite Disks," Tulsa, OK, 1995, Catalog 77-8500, Section C, 4 pages.

Burkman et al., "Wet Chemical Processes–Aqueous Cleaning Processes", Handbook of Semiconductor Wafer Cleaning Technology, Kern, W. (Ed.), Noyes Publication, Parkridge, NJ, 1993, Chapter 3, 111-151.

(List continued on next page.)

Primary Examiner—John Rivell
(74) Attorney, Agent, or Firm—Woodcock Washburn LLP (57) ABSTRACT

The present invention relates to a pressure relief device and method of using the same. The pressure relief device includes a rupture element containing an inner layer made of an nonferrous-based composition that can preferably withstand contact with corrosive fluids. The inner layer of the rupture element is preferably the only part of the rupture element that is exposed to fluid in the system where it is installed. The pressure relief device may be installed in any system where overpressurization or underpressurization protection is desired. For example, the pressure relief device may be installed in systems where corrosive fluids are used and where an ultraclean environment is needed.

19 Claims, 6 Drawing Sheets

U.S. PATENT DOCUMENTS

| | | | |
|---|---|---|---|
| 4,577,650 A | 3/1986 | McConnell | 134/59 |
| 4,633,893 A | 1/1987 | McConnell et al. | 134/95 |
| 4,738,272 A | 4/1988 | McConnell | 134/59 |
| 4,740,249 A | 4/1988 | McConnell | 134/25.4 |
| 4,778,532 A | 10/1988 | McConnell et al. | 134/10 |
| 4,795,051 A | 1/1989 | Ou | 220/89 A |
| 4,795,497 A | 1/1989 | McConnell et al. | 134/18 |
| 4,856,544 A | 8/1989 | McConnell | 134/95 |
| 4,899,767 A | 2/1990 | McConnell et al. | 134/56 R |
| 4,911,761 A | 3/1990 | McConnell et al. | 134/11 |
| 4,917,123 A | 4/1990 | McConnell et al. | 134/95 |
| 4,978,947 A | 12/1990 | Finnegan | 340/611 |
| 4,984,597 A | 1/1991 | McConnell et al. | 134/95 |
| 5,012,945 A | 5/1991 | Keenan | 220/89.1 |
| 5,121,847 A | 6/1992 | Ellis | 220/89.2 |
| 5,255,809 A | 10/1993 | Ervin et al. | 220/89.1 |
| 5,279,321 A | 1/1994 | Krimm | 137/68.1 |
| 5,333,844 A | 8/1994 | Holcombe et al. | 266/275 |
| 5,368,180 A | 11/1994 | Farwell et al. | 220/89.2 |
| 5,398,640 A | 3/1995 | Locher et al. | 117/23 |
| 5,413,237 A | 5/1995 | Farwell | 220/89.2 |
| 5,499,649 A | 3/1996 | Tomasko et al. | 137/68.27 |
| 5,569,330 A | 10/1996 | Schild et al. | 134/1 |
| 5,571,337 A | 11/1996 | Mohindra et al. | 134/25.4 |
| 5,979,477 A | 11/1999 | Stillings | 137/1 |

OTHER PUBLICATIONS

BS&B Safety Systems, "Solid Metal Rupture Disks Type B," Tulsa, OK, Catalog 77–2003, Section C–2, 1–10, Date Unknown.

"CFM Technologies. The Next Generation in Wet Processing" brochure, CFM Technologies, West Chester, PA., Date Unknown.

Fike Metal Products, "Process Safety Protection," Rupture Discs and Explosion Protection, Catalog C7387–8 498, 1–94, Date Unknown.

Finn, R., et al., "Engineering Materials And Their Applications," Houghton Mifflin, Co., 1975, 268–271.

"Full–Flow™ Wet Processing" brochure, 1993, CFM Technolgies, Inc., West Chester, PA.

Kern, W. et al., "Chemical Etching", Thin Film Processes, Vosser, J.L. (ed.), Academic Press, NY, 1978, vol. 1, pp. 403–447 and 452–481.

Kern, W. "Overview and Evolution of Semiconductor Wafer Contamination and Cleaning Technology", Handbook of Semiconductor Wafer Cleaning Technology, Kern, W. (Ed.), Noyes Publication, Parkridge, NJ, 1993, Chapter 1, 3–67.

Oklahoma Safety Equipment Company, Custom Engineered Rupture Disks and Components, Broken Arrow, OK, 5 pages, Date Unknown.

Oklahoma Safety Equipment Company, "STD Rupture Disk," Broken Arrow, OK, 3 pages, Date Unknown.

Oklahoma Safety Equipment Company, "Rupturite™ type RT 3," The Graphite Disk from Oseco, Broken Arrow, OK, 4 pages, Date Unknown.

Oklahoma Safety Equipment Company, "OTU/Special Assemblies,"Broken Arrow, OK, 3 pages, Date Unknown.

Saphikon, "Solutions in Sapphire Newsletter Issue #1," http://www.saphikon.com/sis1.htm, 1997, 1–5.

Saphikon, "Solution in Sapphire Newsletter Issue #2," http://www.saphikon;com/sis2.htm, 1998, 1–8.

Saphikon, "Burst Pressure Comparison: Sapphire vs. Quartz Tubes," http://www.saphikon.com/tubebrst.htm, 1998, 1–3.

Saphikon, "Properties and Benefits of Sapphire for the Semiconductor Processing Industry," http://www.saphikon.com/semiprop.htm, 1998, 1–15.

Verhaverbeke, S. et al., "Scientific Rinsing and Drying on Macro and Microscale," in Semiconductor Pure Water and Chemicals Conference 1996, Balazs,M.K. (ed.), Santa Clara, CA Mar. 4–7, 1996, 14 pages.

_Fig. 2A_

_Fig. 2B_

PRESSURE RELIEF DEVICE AND METHOD OF USING THE SAME

CROSS-REFERENCE TO RELATED APPLICATIONS

This application claims the benefit of U.S. Provisional Application No. 60/130,466, filed on Apr. 22, 1999, the disclosure of which is hereby incorporated by reference in its entirety.

FIELD OF THE INVENTION

The present invention relates to a pressure relief device and method of using the same. The pressure relief device is useful in systems needing protection from overpressurization or underpressurization. The pressure relief device of the present invention is particularly useful in systems where an ultra-clean environment is desired.

BACKGROUND OF THE INVENTION

A wide variety of pressure relief devices for preventing overpressurization or underpressurization in systems have been developed. A pressure relief device generally operates by relieving fluid pressure when a predetermined pressure is reached in a system either through a part of the pressure relief device breaking, fragmenting, severing, etc., to create a path for fluid to escape. Pressure relief devices in use today include for example rupture disks, safety relief valves, safety heads, and explosion vents.

Pressure relief devices are currently made of common or exotic metals, such as stainless steel, nickel, inconel, monel, aluminum, Hastelloy C, or tantalum; carbon, such as graphite, baked carbon, or resin impregnated carbon; or rigid plastics such as polyphenylene sulfide. Pressure relief devices can also be made of a single part or several parts. For example, single part rupture disks are typically flat or domed-shaped, and typically are made of either metal or graphite. Rupture disks containing several parts (hereinafter referred to a "composite rupture disks") include several different components made of the same or different materials. For example, a rupture disk may contain one or more reinforcing layers of plastic in combination with metal, or may include additional components such as vacuum supports or disk cutting elements.

Common rupture disk designs include domed shaped disks having concave and convex sides. Dome shaped rupture disks where the concave side is exposed to fluid pressure is commonly known as a "conventional rupture disk." Conventional rupture disks are placed in tension by the force of fluids under pressure, and rupture occurs when the tensile strength of the disk material is exceeded. Dome shaped rupture disks where the convex side of the disk is exposed to fluid is known as a reverse buckling disk. Reverse buckling disks are placed in compression by fluid pressure and the concave-convex surface reverses and ruptures when a certain pressure is exceeded. Reverse buckling disks may also include cutting elements that puncture the disk when the disk reverses.

Carbon containing rupture disks (e.g., graphite) also have various designs. One common design is a monolithic type design. In a monolithic type design, a disk formed from carbon contains a central bore that is machined only partially through the thickness of the disk. The depth of the bore is such that the carbon between the bottom of the bore and the unmachined side of the disk is of a thickness and strength to rupture at a desired rupture pressure. The monolithic type disk is typically bolted between pipe flanges and the central portion of the disk between the bottom of the bore and the unmachined side blows out to relieve pressure. Another common design for a carbon containing rupture disk includes a holder and replaceable carbon disk. Upon rupture, only the carbon disk needs to be replaced. Carbon rupture disks and particularly graphite rupture disks have been found to have good chemical corrosion resistance.

However, in certain industries, pressure relief devices made of metals, carbon, and plastics materials are often unacceptable. For example, metallic pressure relief devices can withstand only a limited number of pressurization and depressurization cycles, after which the rating of the device will change or the device will burst at normal operating pressures due to metal fatigue.

Moreover, in industries where corrosive fluids are used, pressure relief devices made of metals, carbon or plastics may be weakened and/or have a shortened lifetime from contact with corrosive fluids. Additionally, the contact of the corrosive fluid with the pressure relief device can result in the formation of undesirable contaminants. These contaminants are especially a concern in systems where an ultra-clean environment is needed (environment where there is minimal particle, metallic, or organic contamination). Examples of such systems are those used in the manufacture of electronic components, such as semiconductors, flat panel displays, and computer memory drive; satellite components; photolithography masks; pharmaceutical; and foods. In these systems, even minute levels of contaminants can have a detrimental effect on the product being produced. Thus, there have been attempts to develop pressure relief devices with improved corrosion resistance properties.

One solution that has been proposed is to line or coat the pressure relief device with a polymeric corrosion resistant material such as a fluoropolymer. Although fluoropolymer liners provide some degree of protection against corrosion of the pressure relief device and contamination of the process fluids used within the system, these liners have a limited life and can pass chemicals or vapors to the pressure relief device. For example, liners can fail via pinholes or tears thus allowing fluids in the system to directly contact the pressure relief device and cause corrosion. Even without such failures, liners can have some permeability to liquids, gases, and dissolved gases in liquids.

Another solution is proposed in U.S. Pat. No. 5,979,477 to Stillings ("Stillings"). Stillings discloses a high purity, non-contaminating, burst disk preferably made of quartz. However, quartz has the disadvantage of being etched by chemicals, such as hydrofluoric acid, that are commonly used in the semiconductor industry. Thus, a burst disk made of quartz will over time become weaker, leading to rupture at a lower pressure than the design rupture pressure.

It is therefore desirable to provide improved materials from which to form pressure relief devices that have greater resistant to corrosive fluids or do not cause significant contamination when in contact with corrosive fluids. It is also desirable to provide materials from which to form pressure relief devices that can better withstand pressurization and depressurization cycles.

SUMMARY OF THE INVENTION

The present invention provides a pressure relief device, designed to rupture at a design rupture pressure, that includes a rupture element having an inner layer that is formed from a nonferrous-based composition and that is the layer closest to the "fluid" side of the system. The nonferrous-based composition contains one or more compounds selected from oxides of aluminum, carbides of silicon or titanium, elemental silicon, elemental germanium or combinations thereof.

In a preferred embodiment of the present invention, the inner layer of the rupture element of the pressure relief device is made of aluminum oxide in single crystal form (sapphire). In a more preferred embodiment, the entire rupture element is made of sapphire.

The present invention also provides a method of relieving overpressurization or underpressurization of fluids in a system that includes installing in the system the pressure relief device of the present invention.

DETAILED DESCRIPTION OF THE INVENTION

The present invention is directed to a pressure relief device that preferably has improved resistance to corrosion when exposed to corrosive fluids such as aqueous solutions of hydrofluoric acid, hydrochloric acid, ammonium hydroxide and sulfuric acid. The pressure relief device also advantageously produces minimal particle, metallic, or ionic contamination through contact with corrosive fluids. The pressure relief device can thus be used in systems needing an ultra-clean environment such as in the manufacture of electronic components, such as semiconductors, flat panel displays, and computer memory drive; satellite components; photolithography masks; pharmaceutical; and foods The pressure relief device of the present invention includes a rupture element having an inner layer made of a nonferrous-based composition. By "rupture element" it is meant the portion of the pressure relief device that provides an "opening" at a desired design rupture pressure. The rupture element may provide an opening through such mechanisms as breaking, bursting, fragmenting, severing or blowing out upon exposure to the design rupture pressure. These mechanisms, and any other mechanism for providing an opening upon reaching a designated design rupture pressure, will hereinafter be referred to as "rupture" or "rupturing" of the rupture element. By "design rupture pressure" it is meant the fluid pressure or a range of fluid pressures, that when exerted on the pressure relief device, causes the rupture element to rupture. By "fluid" it is meant any gas, liquid, or vapor that is present in the system that can come in contact with a portion of the pressure relief device, such as the rupture element.

Figure 1A:
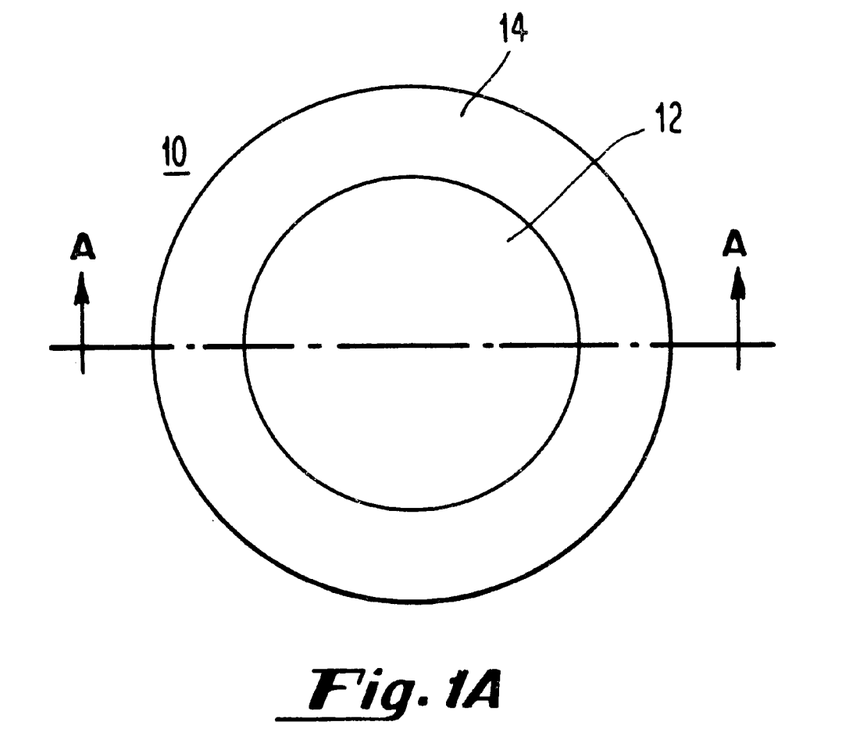
FIGS. 1A and 1B are, respectively, a top view and cross sectional view (taken at line A—A) of an embodiment of the pressure relief device of the present invention.
Figure 1B:
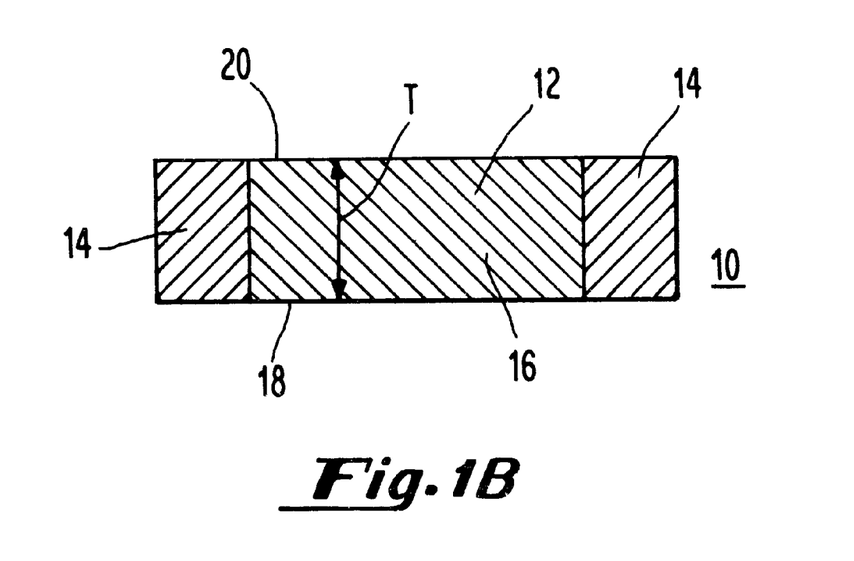

Referring to the Figures, where like numerals refer to like elements, FIGS. 1A and 1B show an embodiment of a pressure relief device 10 of the present invention. FIG. 1A is a top view and FIG. 1B is a cross-sectional view at line A—A of pressure relief device 10. The pressure relief device 10 has a rupture element 12 of a thickness T, and a support member 14 that circumferentially surrounds the rupture element 12. The support member 14 is used to hold the rupture element 12 in a system. For example, the support member 14 can be used to hold the rupture element 12 in a pipe between two pipe flanges. The rupture element also has an inner layer 16 having an inner surface 18 that is the layer closest to the "fluid side" of the system. The rupture element 12 also has an outer surface 20 that is separated from inner surface 18 by thickness T.

The pressure relief device is preferably designed so that only the inner layer is exposed to fluid in the system prior to rupture of the rupture element. Although in FIGS. 1A and 1B the entire inner layer 16 is shown as being part of the rupture element, a portion of the inner layer could be "nonrupturing" so that a portion of the inner layer remains intact after rupture of the rupture element. Preferably, all of the inner layer is part of the rupture element to provide maximum cross sectional area for pressure relief.

The inner layer 16 of the pressure relief device 10 is preferably made of any nonferrous-based composition that can withstand contact with corrosive fluids, and can remain intact below the design rupture pressure. The inner layer is also preferably made of a nonferrous-based composition that can withstand the system operating temperatures. Preferred system operating temperatures are from about 15° C. to about 200° C., and more preferably from about 20° C. to about 90° C.

The nonferrous-based compositions are selected in a manner so that the inner layer has appropriate strength properties to achieve a desired design rupture pressure. Strength properties that are preferably considered include, but are not limited to, ultimate yield, yield strength, and modulus of elasticity. These strength properties are affected by, for example, the degree of crystallinity, the direction or orientation of crystals, and the thickness of the nonferrous-based composition. One skilled in the art would know how to select suitable strength properties to achieve a desired design rupture pressure. Although the desired strength properties of the inner layer will depend upon the particular application, the inner layer preferably has a yield strength of at least about 5 kpsi, a tensile strength of at least about 10 kpsi, a Young's modulus of at least about $5 \times 10^6$ psi, and/or a modulus of rigidity of about $5 \times 10^6$ psi.

The nonferrous-based composition is also preferably corrosion resistant to fluids used in the system. By "corrosion resistant" it is meant that the nonferrous-based composition is preferably resistant to any type of reaction with a fluid that results in the nonferrous-based composition being weakened. For example, it is preferred that the nonferrous-based composition be resistant to erosion, attack or degradation with fluids used in the system. Preferably, the nonferrous-based composition is corrosion resistant to such corrosive fluids as strong acids such as hydrochloric acid, phosphoric acid, sulfuric acid; strong bases such as sodium hydroxide, ammonium hydroxide; solvents or solutions containing amines, amides, or N-methyl pyrrolidone; weak acids such as hydrofluoric acid or ammonium fluoride; or oxidizers such as hydrogen peroxide or ozone.

Also, it is preferable that a fluid coming into contact with the nonferrous-based composition of the inner layer not be contaminated. Contamination could occur, for example, through the reaction, leaching, or dissolution of the nonferrous-based composition in the presence of a fluid used in the system to form contaminants. These contaminants once formed may then be transported into the fluid and cause contamination of the system. Preferably, the nonferrous-based composition is chosen so that contact of the nonferrous-based composition with a fluid in the system forms less than 5 particles per milliliter of fluid having a weight average particle size greater than 0.2 microns, and more preferably less than 5 particles per milliliter of fluid having weight average particle size greater than 0.005 microns; less than 1 part per billion metallic compounds in the fluid, less than 1 part per billion ionic compounds in the fluid, and less than 5 parts per billion organic compounds in the fluid.

Suitable nonferrous-based compositions include for example from about 20 to 100 percent by weight, more preferably from about 50 to 100 percent by weight, and most preferably from about 80 to 100 percent by weight, based on the total weight of the composition of one or more compounds selected from oxides of aluminum; carbides of silicon or titanium; elemental silicon such as polysilicon, or elemental germanium, or combinations thereof. Preferably, the nonferrous-based composition is in a crystalline (e.g., single crystal or polycrystalline) or homogeneous form to increase the strength of the nonferrous-based composition. Preferred crystalline or homogeneous nonferrous-based compositions include compounds of aluminum oxide (e.g., alumina), silicon, or germanium, and more preferably aluminum oxide (e.g., alumina) in single crystal form (i.e., sapphire). Amorphous nonferrous-based compositions may also be used, such as silicon carbide or polysilicon. In a more preferred embodiment of the present invention, the nonferrous-based composition contains from about 90 to 100 weight percent sapphire, or from about 90 to 100 weight percent silicon carbide, with a nonferrous-based composition of 100 weight percent sapphire being the most preferred.

The nonferrous-based composition may also optionally include other compounds to improve the properties of the inner layer of the pressure relief device. For example, compounds that improve the strength or corrosion resistance of the pressure relief device can be added. Preferably, such other compounds remain substantially nonreactive with the fluids present in the system. Examples of suitable compounds include for example dopants such as phosphorous, boron, argon, antimony in elemental form. Preferably if present, the optional compounds are present in an amount of from about 0.05 weight percent to about 10 weight percent and more preferably from about 0.1 weight percent to about 3 weight percent based on the total weight of nonferrous-based composition.

Figure 2A:
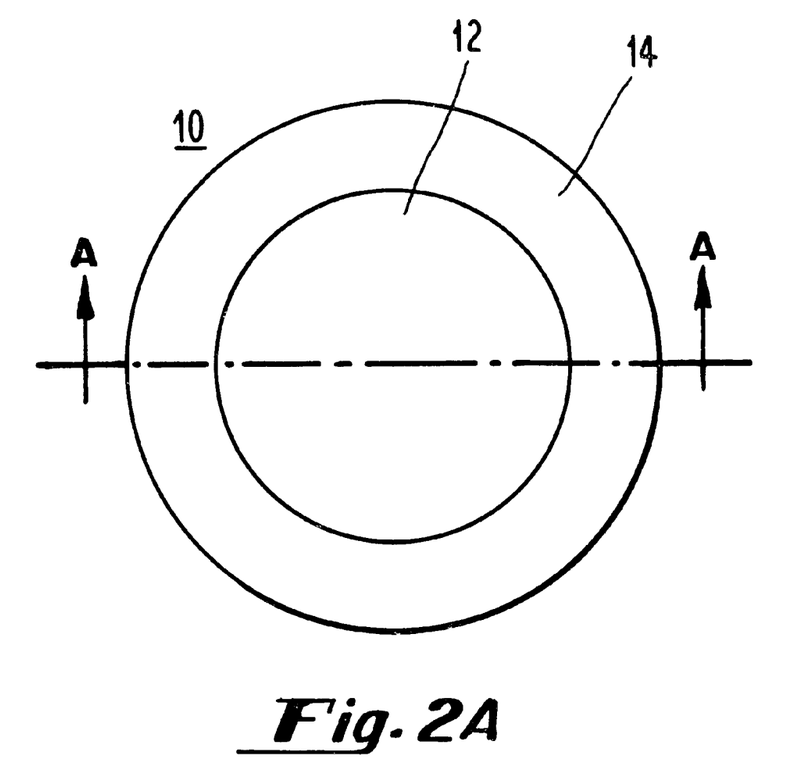
FIGS. 2A and 2B are, respectively, a top view and cross sectional view (taken at line A—A) of another embodiment of the pressure relief device of the present invention where the rupture element has two layers.
Figure 2B:
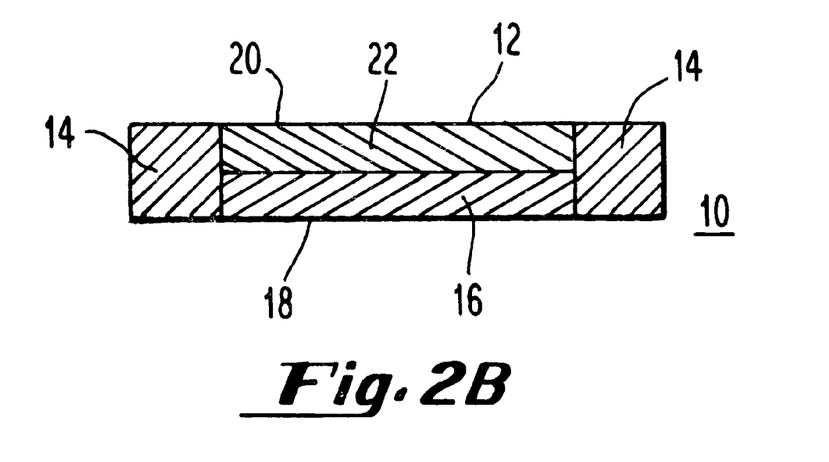

The rupture element may include one or more outer layers adjacent to the inner layer of other types of materials such as metal, plastic or graphite. For example, FIGS. 2A and 2B shows a top view and cross-sectional view (respectively) of an embodiment of a pressure relief device of the present invention where rupture element 12 has an inner layer 16 made of, for example, sapphire, and a second layer 22 located adjacent to the inner layer made of, for example, a metal. The thickness of the inner layer and the second layer can be varied according to techniques known to those skilled in the art to obtain a desired design rupture pressure. When the rupture element includes more than one layer, preferably, the thickness of the inner layer will be from about 0.3 millimeters (mm) to about 10 mm and more preferably from about 0.5 mm to about 5 mm. The total thickness of the rupture element preferably ranges from about 1 mm to about 50 mm and more preferably from about 15 mm to about 25 mm.

Although not shown, it is also possible that the inner surface 18 of the inner layer or outer surface 20 of the second layer be lined or coated with a polymeric material such as a fluoropolymer to provide additional corrosion resistance. Typically such linings or coatings are from about 0.15 mm to about 4 mm in thickness.

In a preferred embodiment as shown in FIGS. 1A and 1B the rupture element is formed of only the inner layer. In this embodiment, the thickness of the inner layer will be adjusted so that the rupture element ruptures at the desired design pressure. For example, to decrease the design rupture pressure, the thickness of the rupture element could be appropriately decreased. Preferred thicknesses for the inner layer in this embodiment are from about 0.3 mm to about 10 mm, and more preferably from about 0.5 mm to about 5 mm. However, smaller or greater thicknesses could be used depending on the pressure relief device and desired design rupture pressure.

One skilled in the art will recognize that the pressure relief device may be made in various shapes and dimensions to suit the particular application. For example, the cross sectional area and diameter of the rupture element will depend upon such variables as the maximum allowable working pressure of the system such as a vessel; the physical properties of the fluids, the temperature of the fluids, the flow rate or pressure of the fluids, the characteristics of any reactions desired to be performed in the system, and the desired margin of safety. Guidelines for sizing pressure relief devices are well known to those skilled in the art and can be found in for example PTC 25-1994 Pressure Relief Devices, and ASME Pressure Vessel Code Section VIII, Division I, published by ASME, which are hereby incorporated by reference in their entireties. In the present invention, preferred rupture disk diameters range from about 3 mm to about 1000 mm, and more preferably from about 3 mm to about 75 mm.

The pressure relief device of the present invention can be made of any shape or design that permits the rupture element of the pressure relief device to rupture at a design rupture pressure. FIGS. 3A to 6B show embodiments of various designs for the pressure relief device of the present invention. These FIGS. are being provided to show examples of different designs and are intended in no way to limit the designs that can be employed in the present invention.

Figure 3A:
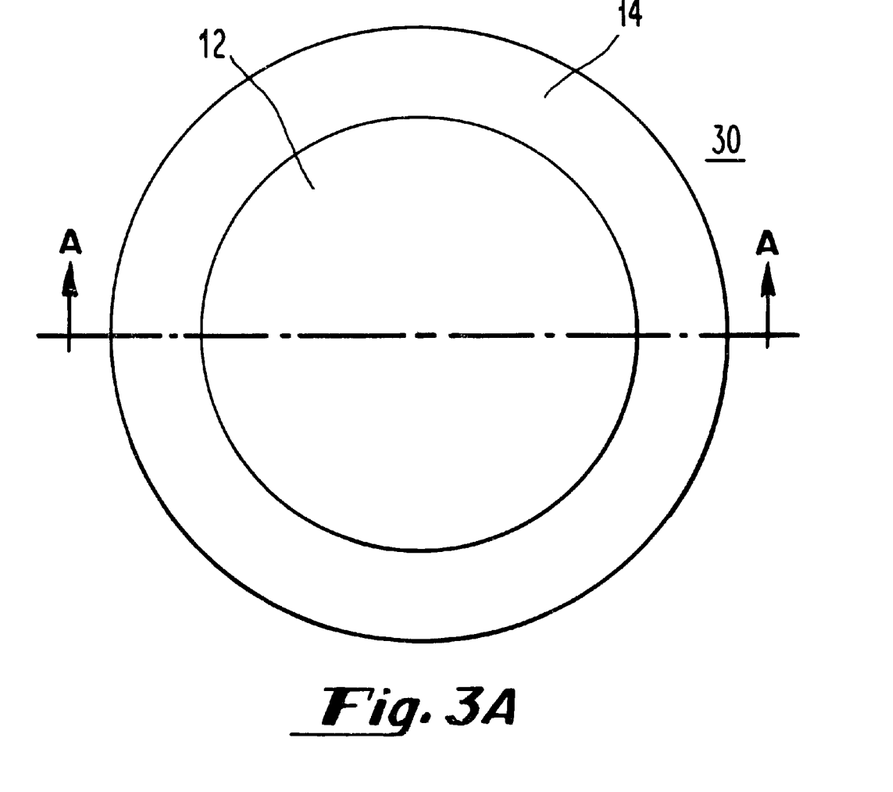
FIGS. 3A and 3B are, respectively, a top view and cross sectional view (taken at line A—A) of another embodiment of the pressure relief device of the present invention where the rupture element is dome shaped.
Figure 3B:
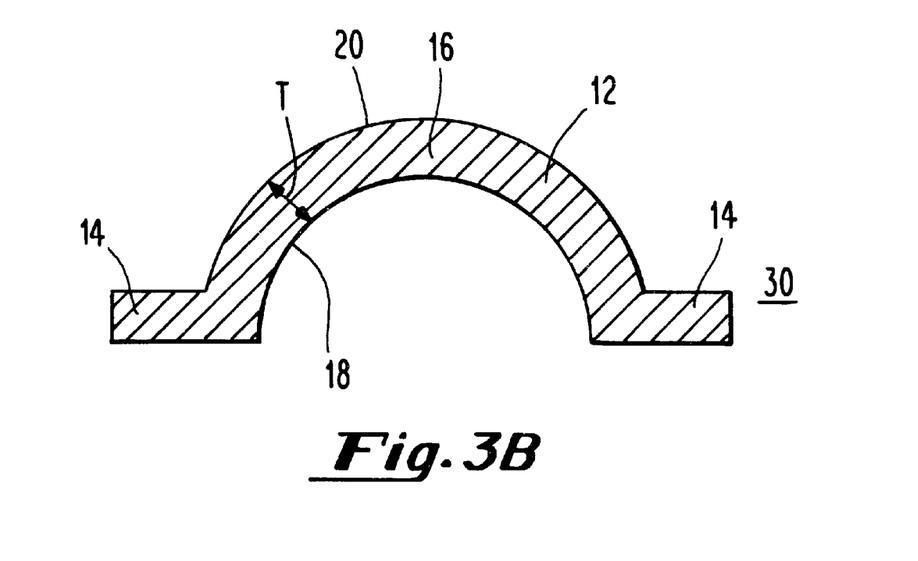

FIGS. 3A and 3B show a top view and cross sectional view (at line A—A in FIG. 3A) respectively of a dome shaped pressure relief device 30. The pressure relief device 30 has a dome shaped rupture element 12 having a thickness T and flat annular shaped support member 14. The rupture element 12 has a concave shaped inner surface 18 and convex outer surface 20. Although not shown, it is also possible to have a convex inner surface and concave outer surface to form a "reverse buckling" type pressure relief device.

As in FIGS. 2A and 2B, the rupture element in FIGS. 3A and 3B may be formed of several layers, as long as the inner layer contains the nonferrous-based composition. For example, the rupture element 12 may include one or more dome shaped outer layers of metal or plastic located adjacent to the inner layer. Such layers may be desired for example to protect against vacuum, drain vapors, or facilitate proper mounting of the pressure relief device to the system. Preferably however, the entire pressure relief device 30 is made of the composition forming inner layer 16.

Figure 4A:
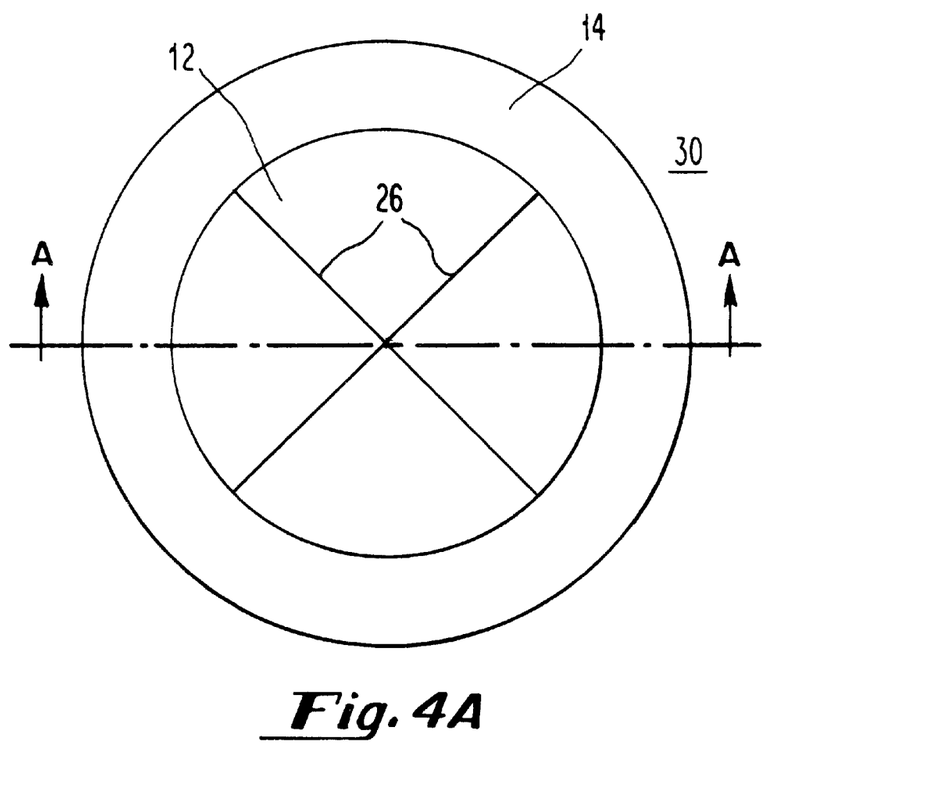
FIGS. 4A and 4B are, respectively, a top view and cross sectional view (taken at line A—A) of another embodiment of the pressure relief device of the present invention where the rupture element is dome shaped and has grooves.
Figure 4B:
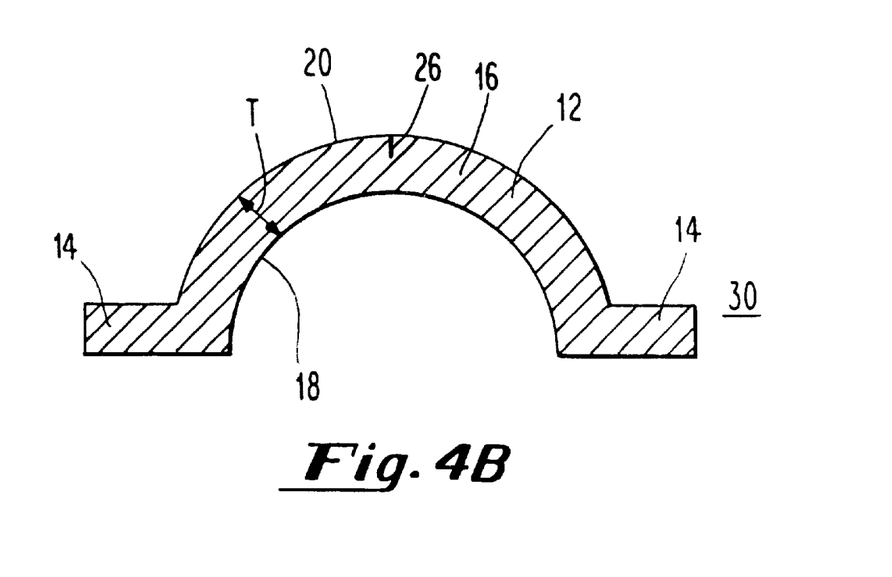

To promote rupturing the rupture element, it may be desired to provide grooves or scores in the pressure relief device. For example, FIGS. 4A and 4B show a dome shaped pressure relief device 30 that is similar to the pressure relief device in FIGS. 3A and 3B, except that the convex outer surface of the rupture disk has one or more grooves 26 (two shown) to help control the rupturing pressure and the point where the rupture element 12 actually fractures. The grooves may be made on the rupture element by any technique known to those skilled in the art. For example, the grooves may be machined or cut into the surface with appropriate blades, or may be formed directly during the manufacture of the pressure relief through the use of a mold. Alternately, or in addition to grooves or scores, the pressure relief device may include cutting devices that "cut" the rupture element during rupture. Any suitable cutting device may be used that is effective in cutting the rupture element. Preferably the outer surface of the rupture element is cut by the cutting device.

Figure 5A:
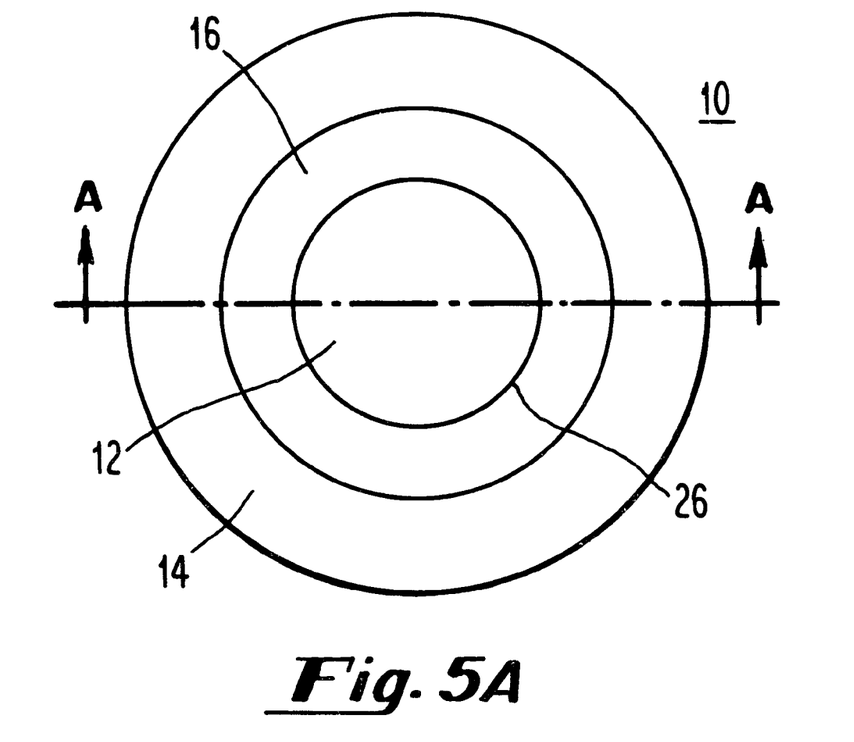
FIGS. 5A and 5B are, respectively, a top view and cross sectional view (taken at line A—A) of another embodiment of the pressure relief device of the present invention that has a support member circumferentially extending below the rupture element.
Figure 5B:
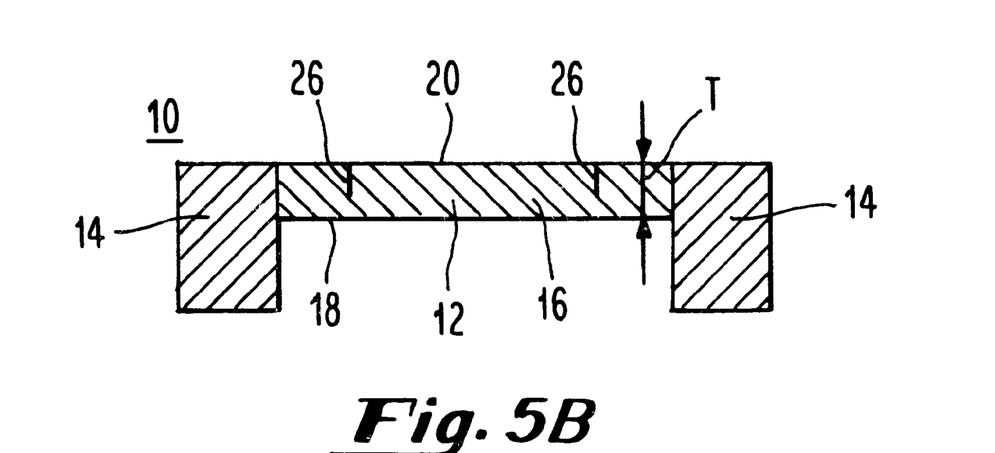

FIGS. 5A and 5B shows another pressure relief device design. The pressure relief device 10 in FIGS. 5A and 5B is similar to the pressure relief device in FIGS. 1A and 1B, except that the rupture element 12 has an annular shaped groove 26 on the outer surface 18 of the rupture element, and the support member 14 extends vertically below the inner surface 18 of the rupture element 12. The annular groove 26 in the rupture element aids in controlling the rupturing pressure and the fracture point of the rupture element 12. In addition to, or alternatively, it is also possible to have one or more grooves located on the inner surface 18 side that extends partially through the inner layer of the rupture element. The depth of the groove in the pressure relief device of the present invention (if present) will depend on such factor as the desired design rupture pressure and product application.

The support member 14 shown in FIGS. 5A and 5B has a greater thickness than the rupture element and extends vertically below the inner surface 18 of the rupture element. This design may relieve stresses placed on the rupture element due to holding assemblies that may affect the performance of the pressure relief device.

Figure 6A:
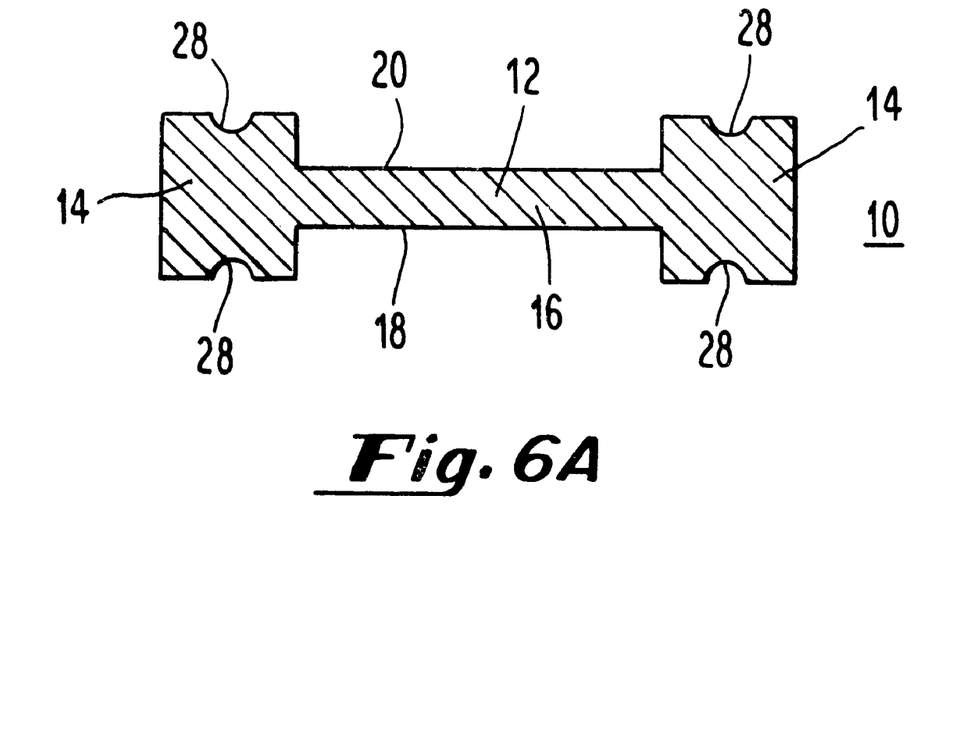
FIG. 6A is a cross sectional view of another embodiment of the pressure relief device of the present invention that has a support member circumferentially extending above and below the rupture element.

It is also possible for the support member to extend above the outer surface 20 or extend both above the outer surface 20 and below the inner surface 18. For example, FIG. 6A shows a cross sectional view of a pressure relief device 10 where the support member 14 and rupture element 12 are made of the same composition such as sapphire, and the support member 14 extends both above the outer surface 20 and below the inner surface 18. The support member 14 of FIG. 6A also has an annular shaped groove 28 that can be used for placement of an o-ring to improve sealing of the pressure relief device 10 in a system. The support member 14 of the pressure relief device may also be of any other design or shape as long as the support member is capable of holding the rupture element 12 in the system.

The support member 14 may be made of any material that can effectively hold the rupture element in the system prior to reaching the design rupture pressure. For example, the support member 14 could be made of a different composition from the inner layer. The support member 14 may also be made of the same composition as the inner layer. For example, in FIGS. 1A and 1B if the support member 14 is formed from the same composition as the inner layer 16, the pressure relief device 10 would be a flat shaped disk made of one composition.

In addition to the rupture element, the pressure relief device may include other optional components. For example, it may be desired to provide supports for vacuum, thermal shock, or system vibrations; fluoropolymer seals; rigid plastic backings for mechanical support; or metal jackets for strain relief. It may also be desired that the pressure relief device be provided with devices or alarms to alert the system user that the pressure relief device has ruptured.

In addition to the aforementioned optional components, the pressure relief device may include a holding assembly for securing the pressure relief device in the system. The holding assembly preferably provides a uniform force about the circumference of the pressure relief device when secured in the system, protects the edges of the pressure relief device during use, holds the pressure relief device during rupture, and/or inhibits leakage of fluid from the system.

Any holding assembly may be used that is effective in holding the pressure relief device in the system. The choice of holding assembly will depend upon such factors as the design rupture pressure, the pressure relief device design, the desired placement of the pressure relief device in the system, the types of fluids being used in the system, and the need for an ultraclean environment. Common holding assemblies useful in the present invention include union type holding assemblies that include two unions held together by a fastener such as a union nut, bolted assemblies including opposing flanges held together by bolts, or threaded assemblies.

Figure 6B:
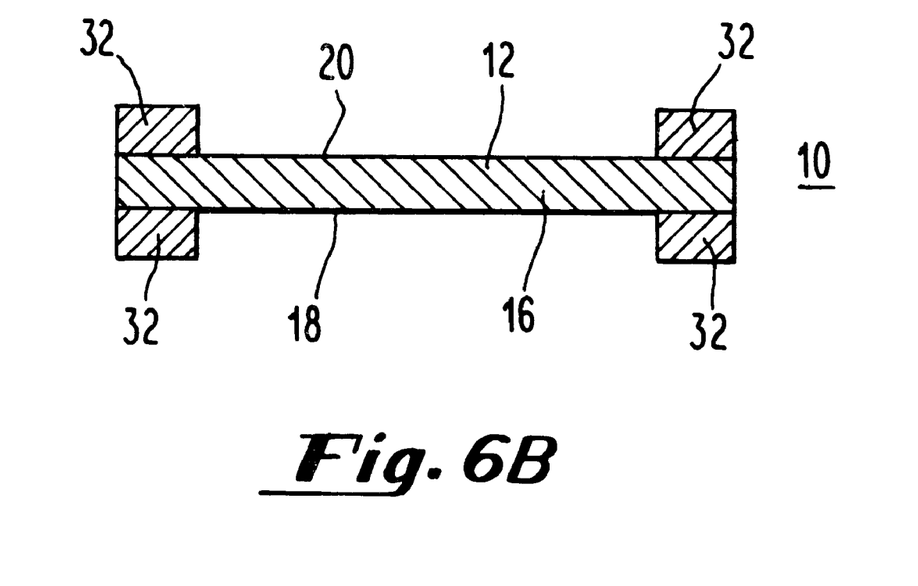
FIG. 6B is a cross sectional view of another embodiment of the pressure relief device of the present invention having a holding assembly.

A preferred holding assembly is shown in FIG. 6B. FIG. 6B shows a cross sectional view of a pressure relief device 10 that is in the shape of a flat disk. The holding assembly 32 is a flat annular shaped ring member located both above and below the rupture element 12. The ring member is preferably made of a "sealing" material, such as plastic or teflon, that protects against the leakage of fluid between the system and holding assembly 32. These and other holding assembly designs are available for example from rupture disk and explosion panel manufacturers.

In a preferred embodiment of the present invention the pressure relief device is composed of a crystalline nonferrous-based composition, such as sapphire, that is in the shape of a flat disk. The flat disk is preferably held in the system between a holding system as shown in FIG. 6B.

The pressure relief the device may be designed to rupture at various design rupture pressures. The pressure at which the rupture element ruptures will depend on such factors as the shape of the rupture element (e.g., flat, convex inner surface or concave inner surface), orientation of the pressure relief device in the system, the presence of grooves or scores in the rupture element, temperature of the system, strength of the material that the rupture element is made from, and thickness of the rupture element. One skilled in the art will know how to design the pressure relief device to rupture at the desired design rupture pressure. Preferably, the pressure relief device is designed to rupture at pressures of from about 5 pounds per square inch (psi) to about 5000 psi, more preferably from about 10 psi to about 100 psi, and most preferably from about 10 psi to about 50 psi. Although, it is contemplated that the pressure relief device could be designed to rupture at lower or higher pressures than these ranges.

The pressure relief device may be manufactured according to techniques well known to those skilled in the art. Examples of suitable manufacturing techniques include molding the pressure relief device or components thereof from a melt; molding and/or sintering the pressure relief device or components thereof from a powder or amorphous material; machining the pressure relief device or components thereof from an ingot, or crystallizing the pressure relief device or components thereof from a melt in a controlled manner. The pressure relief device may also, for example, be formed by physically or chemically depositing the nonferrous-based composition onto a suitable substrate (e.g., through a physical vapor deposition or chemical vapor deposition process). The resulting pressure relief device may also be processed further to form grooves or scores into the pressure relief device.

In a preferred embodiment of the present invention, the inner layer of the pressure relief device (which may also include the support member and/or more than one layer of a rupture element) is formed from a crystal growth process. Suitable crystal growth processes are disclosed for example in U.S. Pat. No. 5,398,640, which is hereby incorporated by reference in its entirety. In the '640 Patent crystalline bodies are formed from a melt using a process commonly referred to as an edge defined film-fed growth technique (hereinafter referred to as an EFG process). The EFG process can be used to form single crystal bodies of for example, aluminum oxide (e.g., sapphire), germanium, or silicon. A single crystalline inner layer is preferred as it is believed properties such as strength and high temperature resistance are improved, although other crystal orientations can be used as well. Following the crystal growth process, the resulting inner layer may optionally be machined, if necessary, to the desired thickness and shape. For example, grooves may be machined into the inner layer.

Preferably, the entire rupture element and support member is made by an EFG process. For example, a rupture device such as in FIGS. 1A and 1B or 2A and 2B could be made from sapphire using this method. A source of sapphire or other crystalline materials prepared by crystal growth processes useful in the present invention can be obtained from Saphikon, Inc., located in Milford, N.H.

The pressure relief device of the present invention can be installed in various locations in a system needing protection from overpressurization or underpressurization (e.g., vacuum protection) using techniques well known to those skilled in the art. For example, the pressure relief device could be used as the primary relief for a system such as a vessel. The pressure relief device could also be used as secondary relief to other pressure relief devices or pressure relief valves in a system. The pressure relief device could also be used in combination with other pressure relief device such as a pressure relief valve to help in protecting the pressure relief valve under normal operating conditions. As one skilled in the art will recognize, the design rupture pressure will in part depend on the desired place of installation of the pressure relief device in the system (whether primary, secondary or combination relief).

The pressure relief device can be installed in any system needing overpressurization or underpressurization protection. Systems where overpressurization or underpressurization protection is needed include for example, systems for making and distributing chemicals, such as commodity chemicals, specialty chemicals or pharmaceuticals; systems for manufacturing electronic components, such as semiconductor wafers, flat panels, computer memory drives other electronic component precursors; systems for making satellite components or photolithography masks; storage tanks; tank cars; or any other system containing fluids that can be overpressurized.

In a preferred embodiment of the present invention, the pressure relief device is used in systems where corrosive fluids are used. As described previously, the inner layer of the rupture element useful in the present invention is corrosion resistant, thus eliminating the need for fluoropolymer liners (although fluoropolymer liner could optionally be used). The pressure relief device of the present invention is also preferably used in systems where even minute levels of contaminates such as particles, or metallic, ionic, or organic residues can have a significant impact on product yields. Examples of such systems include systems for manufacturing electronic components; satellite components; photolithography masks; pharmaceuticals or food products.

In a preferred embodiment of the present invention, one or more pressure relief devices of the present invention are installed in systems for wet processing electronic components. Wet processing systems include for example single vessel systems such as Full-Flow™ vessels manufactured by CFM Technologies, Poiseidon manufactured by Steag, and 820FL manufactured by Dainippon Screen or wet bench systems (systems having a plurality of open baths). Preferred single vessels systems include those disclosed in U.S. Pat. Nos. 4,778,532, 4,917,123, 4,911,761, 4,795,497, 4,899,767, 4,984,597, 4,633,893, 4,917,123, 4,738,272, 4,577,650, 5,571,337 and 5,569,330, the disclosures of which are herein incorporated by reference in their entirety. Wet processing may be used for example to prepare electronic component precursors for processing steps such as diffusion, ion implantation, epitaxial growth, chemical vapor deposition, and hemispherical silicon grain growth, or combinations thereof.

In wet processing systems, the pressure relief device can be installed in a location where high pressure or vacuum is used to transport chemicals, or where pressure or vacuum is provided for reactions. Thus, the pressure relief device of the present invention can be used to provide pressure relief for pressurized containers, chemical piping, vacuum systems, furnaces, pressurized reaction vessels, such as for plasma, chemical vapor deposition, or physical vapor deposition reactions, and combinations thereof.

The present invention is especially suited for use in wet processing systems for many reasons. For example, many of the chemical solutions used in wet processing are corrosive (such as HF, HCl, $H_2SO_4$ and $NH_4OH$). Moreover, in wet processing systems, it is important to maintain an environment where particle contamination is minimized. It has been found that conventional pressure relief devices, such as those made of metal, generally do not withstand this corrosive environment satisfactorily. It has also been found that corrosion of conventional pressure relief devices not only undesirably weakens the device, but also contributes to contamination during wet or dry processing through the reaction of the pressure relief device with the corrosive fluids to produce such contaminants as iron oxide particles.

It has been found that the pressure relief device of the present invention having an inner layer made of a nonferrous-based composition is in most cases well suited for use with corrosive fluids in an ultra clean environment such as in wet processing systems. An additional advantage to having the inner layer of the rupture element made of the nonferrous-based composition is that the pressure relief device can withstand cycling of pressures more readily, thus increasing the overall life of the pressure relief device.

Although the present invention has been described above with respect to particular preferred embodiments, it will be apparent to those skilled in the art that numerous modifications and variations can be made to those designs. The descriptions provided are for illustrative purposes and are not intended to limit the invention.

What is claimed is:

1. A pressure relief device for use in systems for wet processing electronic components, comprising:

a rupture element having an inner rupture layer comprising at least 80 percent by weight of sapphire, carbides of silicon or combinations thereof;

wherein the rupture element is designed to rupture at a design rupture pressure, and wherein the inner rupture layer is essentially corrosion resistant to corrosive wet processing fluids comprising hydrofluoric acid, hydrochloric acid, ammonium hydroxide, sulfuric acid, and hydrogen peroxide.

2. The device of claim 1 wherein the rupture layer comprises sapphire.

3. The device of claim 1 wherein the rupture layer comprises silicon carbide.

4. The device of claim 1 wherein the rupture element is shaped as a flat disk.

5. The device of claim 4 wherein the inner rupture layer of the rupture element has a thickness of from about 0.3 mm to about 10 mm.

6. The device of claim 1 wherein the rupture element has a concave or convex shape.

7. The device of claim 1 further comprising a support member that circumferentially surrounds the rupture element for supporting the rupture element.

8. The device of claim 7 further comprising a holding assembly for securing the device in a system.

9. The device of claim 8 wherein the holding assembly comprises a sealing member located above and below the rupture element.

10. The device of claim 1 wherein the inner rupture layer is machined to a desired thickness.

11. The device of claim 1 wherein the inner rupture layer has one or more grooves.

12. The device of claim 1 wherein the inner rupture layer consists of sapphire.

13. The device of claim 1 wherein the inner rupture layer consists of silicon carbide.

14. A pressure relief device comprising arupture element having an innerrupture layer comprising at least 90 percent by weight sapphire, wherein the rupture element is designed to rupture at a design rupture pressure.

15. The pressure relief device of claim 14 wherein the inner rupture layer consists of sapphire.

16. A method of relieving overpressurization or underpressurization of fluids in a system for processing electronic components, comprising:

installing in the system a pressure relief device comprising a rupture element having an inner rupture layer comprising at least 80 percent by weight of sapphire, carbides of silicon or combinations thereof;

wherein the rupture element is designed to rupture at a design rupture pressure, and wherein the inner rupture layer is essentially corrosion resistant to corrosive wet processing fluids comprising hydrofluoric acid, hydrochloric acid, ammonium hydroxide, sulfuric acid, and hydrogen peroxide.

17. The method of claim 16 wherein the system is a wet processing system for electronic components.

18. The method of claim 16 wherein the inner rupture layer consists of sapphire.

19. The method of claim 16 wherein the inner rupture layer consists of silicon carbide.

* * * * *